J. BOGUE.
EVAPORATOR.
No. 49,851. Patented Sept. 12, 1865.
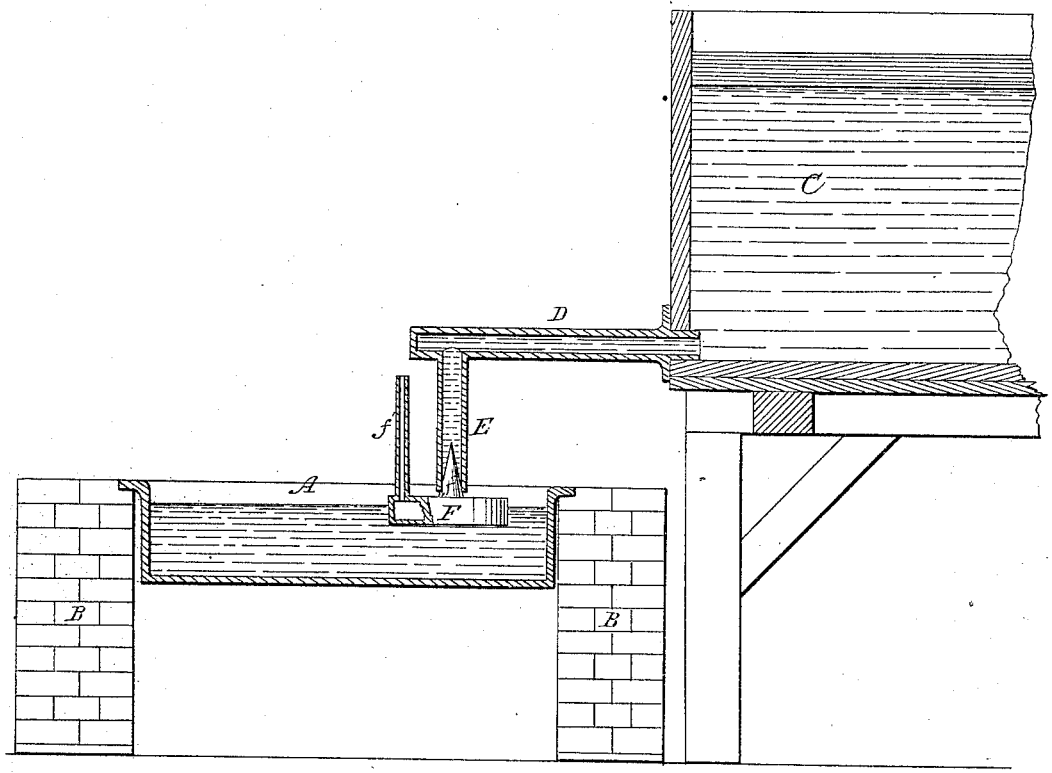
Witnesses.
Alex. A. C. Klauckt.
W. F. Hall.
Inventor.
John Bogue,
By Munn & Co
Attorneys

UNITED STATES PATENT OFFICE.

JOHN BOGUE, OF AUBURN, WISCONSIN.

IMPROVED EVAPORATOR.

Specification forming part of Letters Patent No. 49,851, dated September 12, 1865.

*To all whom it may concern:*

Be it known that I, JOHN BOGUE, of Auburn, in the county of Fond du Lac and State of Wisconsin, have invented a new and useful Improvement in Evaporators; and I do hereby declare that the following is a full, clear, and exact description of the nature, construction, and operation of the same, reference being had to the accompanying drawing, which is made part of this specification, and in which is represented a sectional elevation of an evaporator embodying my invention.

My said invention consists of a float of peculiar construction, employed to regulate the influx of sap to the evaporating-pan.

The following description, with the aid of the drawing, will enable others skilled in the art to which my invention appertains to fully understand and use the same.

A represents the evaporating-pan, and B the walls which support it and inclose the fire.

C is a reservoir containing the sap to be evaporated, which flows therefrom into the evaporating-pan through the conducting-pipes D E, the latter of which has a vertical position over the pan A, and may project downward to a point just below the upper edge of said pan.

As the parts referred to are not the subject of my invention, they may be constructed in any known or approved way.

F is a hollow float, which may be circular, square, or of any other form. Rising from the center is a conical plug, $f$, which, when the float is high enough, closes the lower end of the pipe E, and thus prevents the sap from running into the pan. The height of the float F is determined by the height of the liquid in the pan, and when in consequence of the diminution produced by evaporation the liquid has fallen, the float has also fallen, and the plug $f$ being thus partially retracted from the pipe E, allows the influx of sap. By using the float it will be seen that the pan may always be made to contain a nearly uniform quantity of sap, which will be that best adapted for evaporation.

Heretofore the float has been made hollow and tight, so that the air within the same which is expanded by the heated liquid must make for itself a ventage from the float, in doing which the latter is cracked and a rent produced which permits the sap to enter the float. The float is thereby made heavy, and sinks or becomes defective in its operation.

In the float here illustrated a small tube, $f'$, communicates with the interior of the float and projects upward to a sufficient extent to prevent the entrance of liquid through it. This tube affords the necessary ventage to prevent injury to the float by the heated air, and by its use the float is preserved in a perfect condition.

This device is of such a simple character that very little expense is involved in its application, and it admits of being constructed within a small compass, so as not to cover much of the surface of the sap in the pan.

Having now described my invention, the following is what I claim as new, and desire to secure by Letters Patent:

1. The arrangement of the hollow float F, plug $f$, tubes D and E, reservoir C, and pan A, substantially as described.

2. Constructing the float with a ventage-tube, $f'$, or an equivalent aperture, for the purpose explained.

JOHN BOGUE.

Witnesses:
DAVID GUDEX,
ORIN HELMER.